United States Patent [19]
Yates

[11] Patent Number: 5,647,164
[45] Date of Patent: Jul. 15, 1997

[54] INSECT TRAP

[76] Inventor: William Yates, 40 Farewell Cres. Box 351, Smithville, Ontario, Canada, L0R 2A0

[21] Appl. No.: 513,120

[22] Filed: Aug. 9, 1995

[51] Int. Cl.$^6$ .................................... A01M 1/08
[52] U.S. Cl. ................. 43/139; 43/113; 43/132.1
[58] Field of Search ............. 43/113, 139, 132.1

[56] References Cited

U.S. PATENT DOCUMENTS

| | | | |
|---|---|---|---|
| 3,041,773 | 7/1962 | Gagliano | 43/139 |
| 3,120,075 | 2/1964 | Barnhart, Sr. | 43/139 |
| 3,196,577 | 7/1965 | Plunkett | 43/139 |
| 4,127,961 | 12/1978 | Phillips | 43/139 |
| 5,167,090 | 12/1992 | Cody | 43/139 |
| 5,209,010 | 5/1993 | Vickery | 43/139 |
| 5,311,697 | 5/1994 | Cavanaugh et al. | 43/132.1 |
| 5,417,009 | 5/1995 | Butler et al. | 43/113 |
| 5,501,033 | 3/1996 | Wefler | 43/131 |

FOREIGN PATENT DOCUMENTS

| | | |
|---|---|---|
| 1144520 | 10/1957 | France . |
| 6601009 | 7/1967 | Netherlands . |
| 1500568 | 2/1978 | United Kingdom . |

*Primary Examiner*—Joseph J. Hail, III
*Assistant Examiner*—Jay A. Stelacone

[57] ABSTRACT

Insects are killed by passing through a fan mounted inside a shaft. A pair of agitator tubes having inlets in fluid communication with the exhaust in the shaft direct exhaust from the fan over bait provided to attract the insects. The bait is contained in a receptacle spaced upstream from the shaft and which houses a light source and optionally an auxiliary heat source. The outlets of the agitator tubes are inside the receptacle so that any exhaust diverted from the shaft into the agitator tube will entrain vapors from the bait as the exhaust exits through a vent provided in the receptacle.

9 Claims, 3 Drawing Sheets

INSECT TRAP

FIELD OF THE INVENTION

This invention relates to apparatus for attracting flying insects, particularly those inclined to bite, most commonly mosquitoes and black flies, and killing them so that a predetermined zone surrounding the apparatus will be free of the insects.

BACKGROUND OF THE INVENTION

Research by entomologists has shown that biting insects are attracted by light, the color blue, heat, and carbon dioxide. While most devices created for the purpose of trapping insects have recognized the attraction that light has for the insects and incorporated a light source which often also gives off at least a moderate amount of heat, very few such devices, if any, have embodied any means for dissipating a bait whether it is in the form of carbon dioxide or another substance.

Typical of prior art devices known to the Applicant, is the mosquito trap shown in U.S. Pat. No. 3,120,075 and which comprises a light source suspended above a container into which is suspended a jar containing insecticide for killing the insects. A propeller disposed at the other end of the container creates a draught to cause the mosquitoes to fall into the "killing" jar. A filter made of netting prevents the mosquitoes from ever coming into contact with the propeller blade so that the killed mosquitoes remain unmutilated for scientific study. The structure shown in U.S. Pat. No. 3,041,773 is similar in that it also provides a light source in the form of a fluorescent tube and the light source is disposed immediately adjacent a fan blade so that any insects attracted by the light are drawn into the fan and killed by the whirling fan blades. Additionally, electrocuting means are provided in this device. An additional light source and a fumigating liquid which is vaporized by the heat of the additional bulb is distributed by the fan blast.

An object of this invention is to provide a device for attracting and killing biting insects which, in addition to the conventional light sources used in other devices, advantageously distributes a bait for attracting the insects.

SUMMARY OF THE INVENTION

In accordance with the invention, there is provided apparatus for attracting and killing insects comprising a shaft with an inlet opening at one end and an outlet opening at the other end, and a fan disposed in the shaft and adapted to create a vacuum whereby the ambient atmosphere enters the shaft at the inlet opening and is exhausted through the outlet opening. The device also includes at least one agitator tube having an inlet in fluid communication with the exhaust in the shaft and an outlet disposed to direct exhaust from the fan over bait provided to attract the insects.

Preferably, the bait is contained in a receptacle which houses a light source and optionally an auxiliary heat source and the outlet of said at least one agitator tube is disposed inside the receptacle so that any exhaust diverted from the shaft into the agitator tube will entrain vapors from the bait as the exhaust exits through a vent provided in the receptacle.

BRIEF DESCRIPTION OF THE DRAWINGS

For a better understanding of the invention, there is described below two preferred embodiments of the invention with reference to the accompanying drawings, in which.

DETAILED DESCRIPTION WITH REFERENCE TO DRAWINGS

Figure 1:
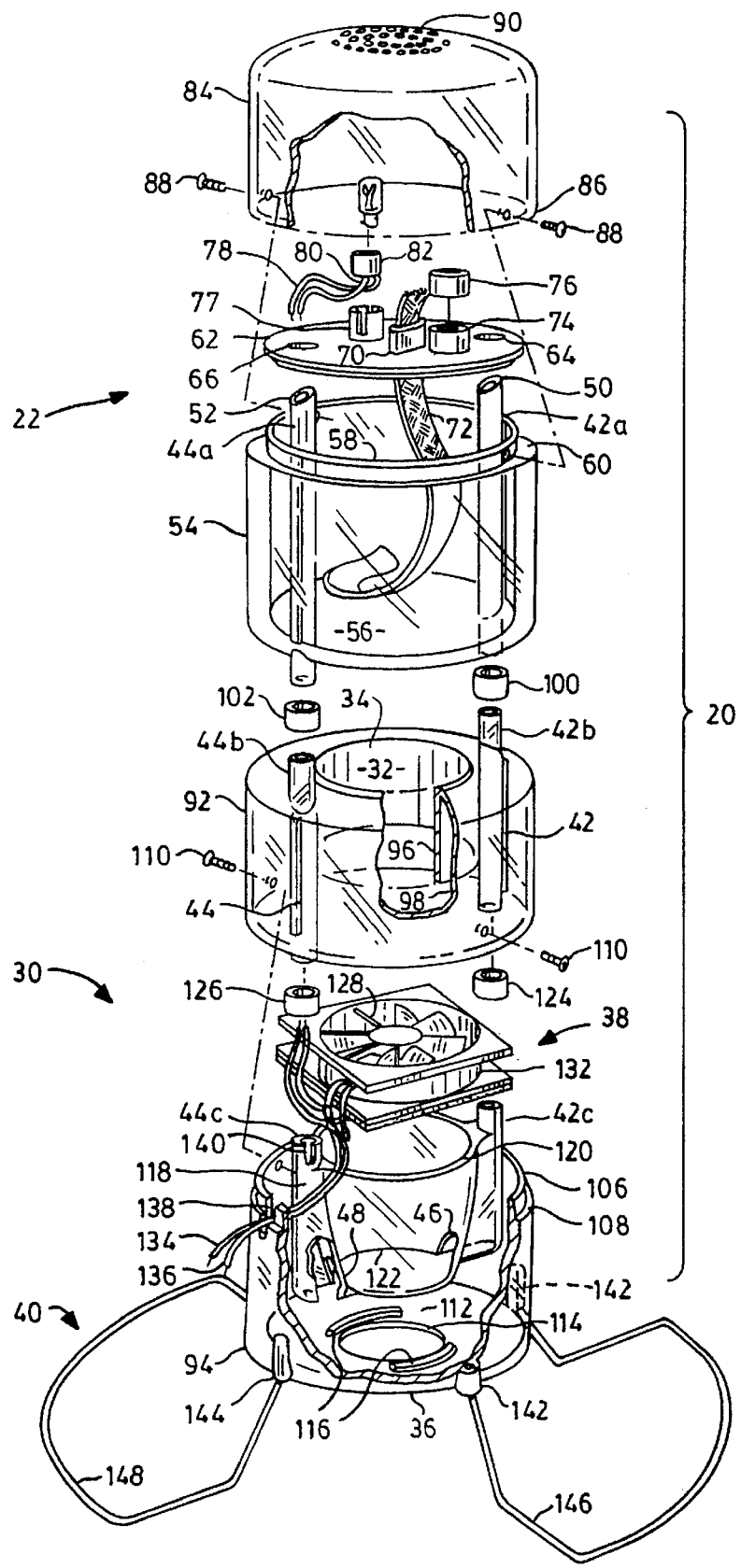
FIG. 1 is an exploded perspective view of an insect trap made in accordance with the invention and showing an embodiment particularly adapted for use in a park setting or in an orchard.

An insect trap made in accordance with the invention is generally indicated by numeral 20 in FIG. 1. The insect trap 20 comprises an upper receptacle 22 for containing bait 24 (FIG. 2), a light bulb 26, and, optionally, a heater (not shown). The receptacle 22 is disposed above a lower casing 30 having an inner wall which defines a shaft 32 having an inlet opening 34 and an outlet opening 36. An electric fan and motor assembly 38 is disposed inside the shaft 32 between the inlet opening 34 and the outlet opening 36. A wire frame stand 40 spaces the outlet opening 36 of the shaft from the ground or surface on which the insect trap 20 is resting.

A pair of agitator tubes 42, 44 disposed on opposite sides of the shaft 32 have respective inlets 46, 48 in fluid communication with the bottom of the shaft 32 and respective outlets 50, 52 disposed inside the receptacle 22.

For convenience in manufacture and assembly of the insect trap 20, the receptacle 22 and the casing 30 are molded from synthetic plastic material formed into cooperating segments. Most preferably, the synthetic plastic material has a translucent blue color which is attractive to flying insects.

The receptacle 22 comprises a bait chamber 54 having a closed bottom 56 and a wide-mouthed top 58 which is inset to define a peripheral lip 60. Upper segments 42a, 44a of the agitator tubes 42, 44 are molded with the bait chamber 54 so as to stand proud of the chamber and extend above the top 58 and below the bottom 56.

A disc-shaped platform 62 rests on the top 58 of the bait chamber 54 and has apertures 64, 66 which receive the upper segments 42a, 44a of the agitator tubes respectively so that the tubes extend above the platform 62. A further opening 68 is molded into the platform 62 with a surrounding collar 70 dimensioned to receive therethrough a wick 72 made of suitable absorbent material. Still a further opening bound by a collar 74 and extending upwardly from the platform 62 on the same side as the collar 70 for the wick is provided for filling the bait chamber 54 with liquid bait. A cooperating cap 76 is provided to cover the bait inlet opening.

The platform 62 additionally includes a socket 77 on its upper surface which is slit to accommodate electric supply leads 78, 80 and an electric socket 82 for supplying the light bulb 26.

The receptacle 22 further includes a molded dome-shaped cover 84 having an open mouthed bottom 86 adapted to rest on the lip 60 of the bait chamber 54. The cover 84 and the top of the bait chamber 54 are each apertured to receive a pair of screws 88 provided to join the cover 84 to the bait chamber 54. The top surface of the cover 84 is provided with a vent 90 comprised of a plurality of openings adapted to allow vapors to escape from the receptacle 22.

The casing 30 for the fan motor assembly 38 is likewise molded into an upper casing element 92 and a lower casing element 94. The upper casing element 92 is characterized by an inner wall 96 which defines the inlet to the shaft 32 and an outer wall 98 spaced from the inner wall 96 to accommodate inbetween respective middle segments 42b, 44b of the agitator tubes 42, 44 which traverse the upper casing element 92 and stand proud of the upper casing element so as to extend above it and below. Annular connections 100, 102 are provided between the bait chamber 54 and the upper casing element 92 to join respective segments of the agitator tubes 42, 44.

The lower casing element 94 has an open bottom 112 and a wide mouthed top 106 which is inset to define a peripheral lip 108 on which the outer wall 98 of the upper casing element 92 rests. Again, cooperating apertures are provided in the upper casing element 92 and the lower casing element 94 to receive a pair of screws 110 for joining the elements together.

The bottom 112 of the lower casing element 94 has a central opening 114 bound by a pair of arcuate stops 116 which locate an inner chamber 118. The inner chamber 118 is molded separately with sloping walls defining a wide-mouthed opening at the top 120 and a smaller opening at the bottom 122. The bottom segments 42c, 44c of the agitator tubes 42, 44 are molded on the outside of the inner chamber 118 with the inlets 46, 48 adjacent to the bottom 122 of the inner chamber. The bottom segments 42c, 44c comprising the agitator tubes extend upwardly from the inner chamber 118 and are joined to the middle segments 42b, 44b of the agitator tubes by respective annular joints 124, 126.

The fan motor assembly 38 is disposed between the upper casing element 92 and the lower casing element 94 comprising the casing 30 and comprises a fan 128 mounted to a shaft driven by a motor 130, mounted in a cylindrical housing 132 dimensioned to mate with the inner wall 96 of the upper casing element 92 and the inner chamber 118. In a prototype of the invention, a seven blade fan with the following specifications was used: operating range 12 VDC; voltage range 7.0–13.8 VDC; current 0.16 A (max); speed 2700 RPM; air flow 27 cfm 0.75 m$^3$; and noise 35 dBA (max).

Thus the shaft 32 for the casing 30 is comprised of the inner wall 96 for the upper casing element, the housing 132 for the fan motor assembly 38, and the inner chamber 118 disposed inside the lower casing element 94. The inlet opening 34 to the shaft is defined at the top of the inner wall 96 while the outlet opening 36 to the shaft is defined by the opening 114 in the bottom 112 of the lower casing element 94.

Electrical supply leads 134, 136 to the fan motor assembly 38 are accommodated in a notch 138 provided in the top 106 of the lower casing element 94. Similarly, a notch 140 is provided in the bottom segment 44c of the agitator tube 44 to receive the electric supply leads 78, 80 housed in the agitator tube 44 and supplying the light bulb 26.

Conveniently, two pairs of sockets 142, 144 are molded into the bottom of the lower casing element 94 and adapted to receive the ends of two lengths of wire 146, 148 comprising the wire frame support 40.

In use, the bait chamber 54 is filled through the opening defined by the collar 74 with a liquid bait selected for the intended application. Extensive experimental work conducted by the Applicant has demonstrated that a liquid mixture of carbon dioxide with octenol is particularly effective for use in park and agricultural settings for the elimination of biting insects. Where the main application is for residential use and directed to the elimination of mosquitoes, a bait comprising only carbon dioxide is adequate whereas a bait comprising molasses has been found to be satisfactory for use inside barns to attract those flies which plague dairy cattle.

The insect trap 20 in accordance with the invention is electrically connected to an appropriate power source which could, for example, comprise a 12 volt battery or a domestic 110 volt supply with a step-down transformer. The electrical fan 128 is driven at 2700 r.p.m. to aspire the surrounding air as indicated by arrows 150 in FIG. 2. The exhausted air indicated by arrows 152 is purged into the inner chamber 118 which, with its sloping walls, operates as a back pressure chamber from which exhausted air emerges through the outlet opening 36 as indicated by arrows 154 and is also diverted into the agitator tubes 42, 44 as indicated by arrows 156. The exhausted air in the agitator tubes 42, 44 is forced upwardly and emerges inside the domed cover 84 of the receptacle 22 where it wafts over the wick 72 which is soaking in the bait 24.

The air inside the receptacle is partly heated as it moves into the agitator tubes and by the light bulb 26. Optionally an auxilary heater may be mounted inside the receptacle. A positive pressure of warm air and entrained vapors is created inside the receptacle 22 and emerges through the vent 90 into the surrounding atmosphere where it is dispersed in accordance with the concentration of the bait 24 and its average specific gravity.

Typically, bait comprising $CO_2$ will have a range extending over a radius of 10 feet (3 meters) with the fan operating to have a flow of 27 cu.ft. per minute. Insects attracted by the bait and the blue light shining through the receptacle will seek out the bait and be entrained in the flow of air drawn through the shaft 32. The insects are shredded as they pass through the fan 128 and they emerge as debris through the opening 114 in the lower casing element 94. Optionally, a filter of suitable weave may be provided inside the lower casing element 94 to collect the shredded insect debris.

The above-described embodiment of the invention finds particular application in a park setting, at a beach, and in tenderfruit growing areas.

Figure 3:
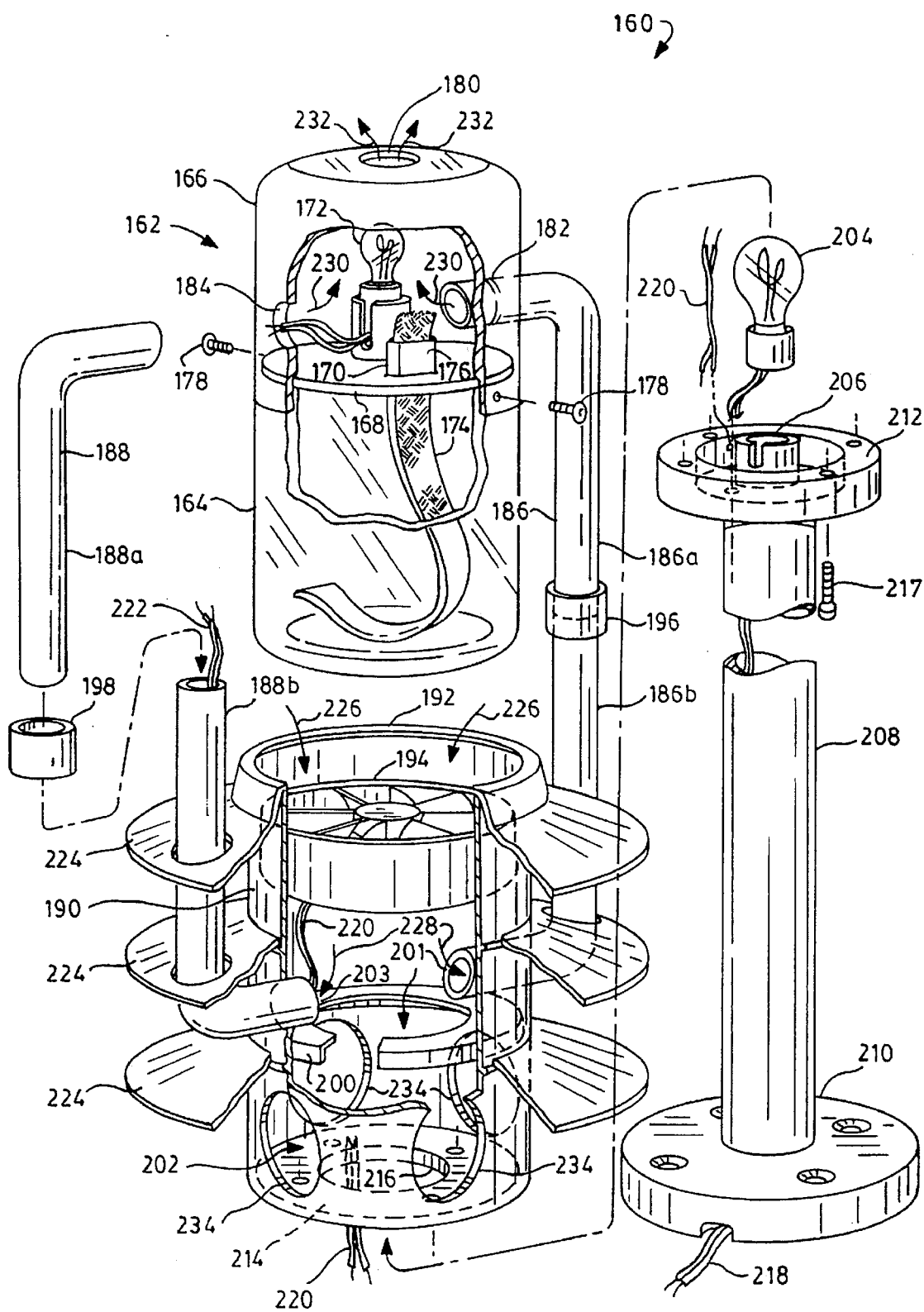
FIG. 3 is a partly sectioned view of an alternative embodiment of the invention particularly adapted for residential use.

An alternative embodiment of the invention shown in FIG. 3 is more particularly adapted for residential use and comprises an insect trap generally indicated by numeral 160.

Figure 2:
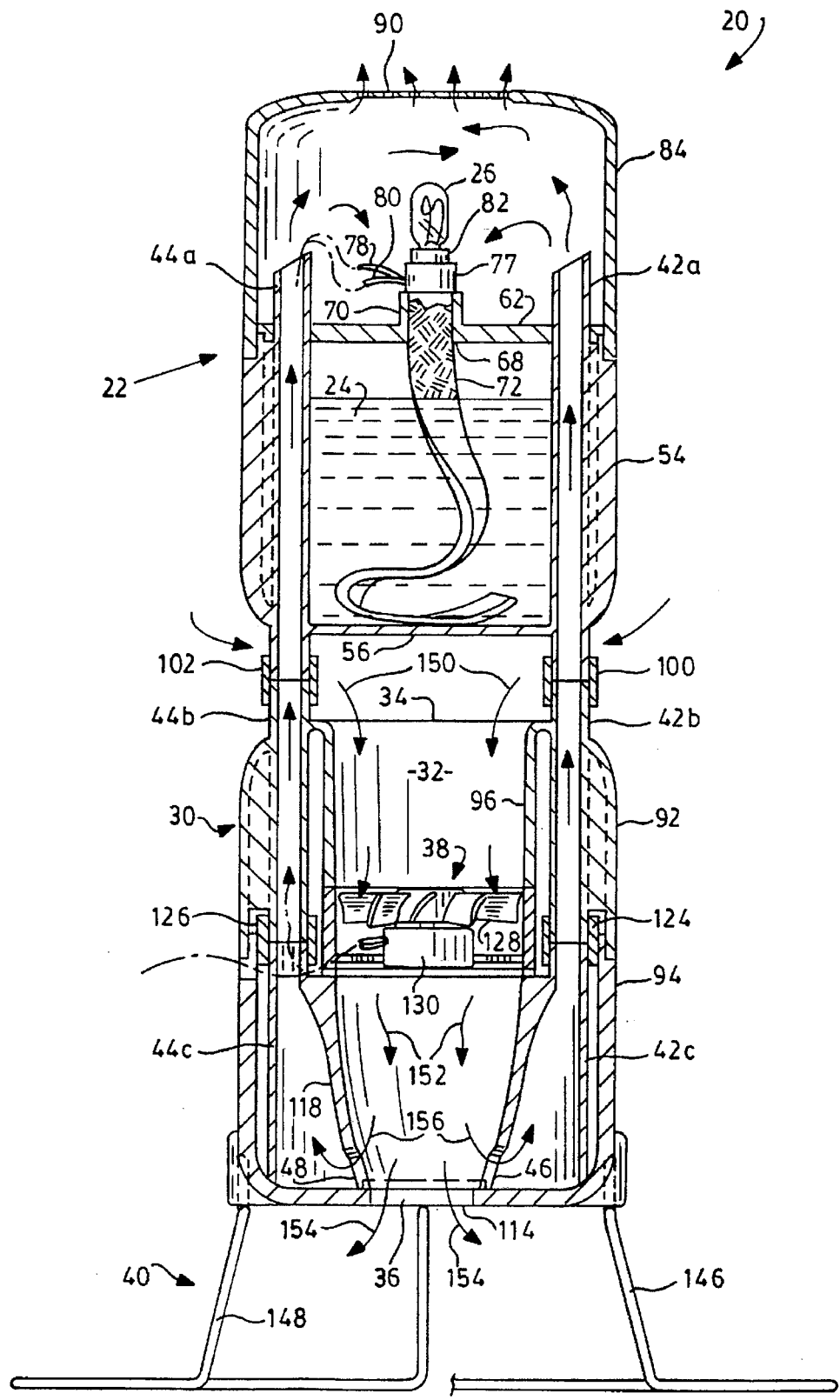
FIG. 2 is a cross-sectional view of the insect trap shown in FIG. 1.

As in the embodiment shown in FIGS. 1 and 2, the insect trap 160 comprises an upper receptacle 162 molded in two component portions comprising a lower bait chamber 164 and an upper domed cover 166. The bait chamber 164 is closed at the bottom and has a wide mouthed top on which rests a platform 168 which carries a socket 170 for an electric light bulb 172 and which is apertured to receive a wick 174 that soaks bait in the bait chamber and emerges through a collar 176 into the interior of the domed cover 166. The cover 166 has a wide mouthed bottom which is joined to the top of the bait chamber by a pair of set screws 178. A vent in the form of an opening 180 is provided in the top surface of the cover 166. A pair of diametrically-opposed apertures 182, 184 provided in the side wall of the cover 166 receive the ends of the respective top segments 186a, 188a of agitator tubes 186, 188.

A cylindrical housing 190 defines a shaft having an inlet opening 192 at its upper end and which receives a fan motor assembly 194 downwardly spaced from the inlet opening.

The agitator tubes each comprise an upper segment designated by the letter a and a lower segment designated by the letter b. The upper segments 186a, 188a of the agitator tubes are elbow-shaped so as to extend outwardly from the domed cover 166 of the upper receptacle 162 and downwardly along the height of the bait chamber 164.

The lower segments 186b, 188b of the agitator tubes are also elbow-shaped so as to extend outwardly from the housing 190 below the fan motor assembly 194 and upwardly along the height of the housing 190. The upper and lower segments of the agitator tubes 186, 188 are of sufficient length so that, when they are joined by respective annular joints 196, 198, the bait chamber 164 is spaced from the inlet opening 192 to the housing 190.

A back pressure plate in the form of an inwardly directed flange 200 is disposed inside the housing 190 and downwardly spaced from inlets 201, 203 to the agitator tubes 186, 188.

The lowermost section of the housing 190 defines a lighting chamber 202 into which is received a light bulb 204 mounted into a socket 206 provided on a hollow pedestal support 208. A set of four openings 234 is provided in the housing 190 in order to allow the light from the light bulb 204 to emanate from the device. A lining made of suitable mesh material may be provided inside the lighting chamber 202 in order to contain any of the insect debris emerging from the fan 194.

The pedestal support 208 has a lower flange 210 adapted to rest on the ground and an upper flange 212 which is adapted to mate with the under surface of an annular bottom 214 for the housing 190. The annular bottom 214 has a central opening 216 for receiving said light bulb 204 into the lighting chamber 202 and suitable fasteners 217 are provided to secure the upper flange 212 of the pedestal support to the housing 190.

An electrical supply cable 218 is fed through the hollow pedestal support 208 to supply the electrical bulb 204 and additional wire pairs 220, 222 supply the fan motor assembly 194 and the light bulb 172, respectively and any optional heaters. Conveniently, the wire pair 222 is fed through one of the agitator tubes 188 to reach the upper receptacle 162.

A pleasing decorative effect is created on the housing 190 with a set of three sloping flanges 224 longitudinally spaced from each other along the height of the housing 190. At least some of the flanges 224 will be apertured in order to receive the lower segments 186b, 188b of the agitator tubes. It is envisaged that the housing 190 will be made of sufficiently flexible material to allow the agitator tubes 186, 188 to be inserted through the flanges 224 and for the inlets 201, 203 to the agitator tubes to be directed inside the housing 190.

In use, a series of lighting devices and insect traps in accordance with the invention would be disposed around the perimeter of an area in which the resident wished to control the ingress of biting insects. Upon connection to a suitable power supply, the lights 172, 204 would provide the desired ambiance while the fan motor assembly 194 would operate to aspire air from its surroundings as indicated by arrows 226. The exhaust from the fan 194 is diverted as indicated by arrows 228 into the agitator tubes 186, 188 to emerge inside the domed cover 166 of the upper receptacle 162 as indicated by arrows 230. The exhaust air thus diverted into the receptacle 162 wafts over the bait-soaked wick 174 so as to emerge from the vent 180 as indicated by arrows 232. The bait vapors are thus dispersed through a positive pressure of warm air emerging from the insect trap and distributed into the surrounding atmosphere. The bait, thus dispersed, attracts insects to the perimeter of the area delimited by the insect traps and, once caught, into the stream of inlet air indicated by arrows 226, the insects meet their demise inside the fan 194.

It will be understood that several variations may be made to the above-described embodiments of the invention within the scope of the appended claims. In particular, it will be understood that the bait may comprise any suitable medium and could, for example, comprise a piece of dry ice conveniently provided in a sealed, replaceable bait chamber or exchangeable container which would be substituted periodically when the bait was spent. It will be noted that carbon dioxide is heavier than air and that it would be contained by the bait chamber when the fan motor assembly was not in operational use.

I claim:

1. Insect trap comprising a shaft having a first end and a second end, and an inlet opening defined at said first end and an outlet opening defined at said second end;

a motorized fan disposed inside the shaft and spaced from said second end of the shaft, the fan being adapted to aspire inlet air and insects entrained in said inlet air into the inlet opening of the shaft and to exhaust outlet air and insect debris entrained in said outlet air into said second end; and a bait receptacle for containing bait and having a vent for discharging outlet air, the bait receptacle being spaced upstream from the inlet opening of the shaft and adapted to allow inlet air to be aspired by the fan between the bait receptacle and the shaft; and at least one conduit having an inlet disposed in said second end of the shaft and spaced from said fan, and an outlet disposed in said bait receptacle, said at least one conduit being adapted to divert at least a portion of the outlet air over the bait so as to disperse the bait into a surrounding atmosphere and attract insects toward the insect trap.

2. Insect trap according to claim 1 having a platform supported in the bait receptacle, a bait chamber for containing liquid bait being disposed beneath said platform, and said at least one conduit being disposed above said platform, a wick traversing said platform being adapted to have one end soaked in liquid bait and another end extending above the platform.

3. Insect trap according to claim 1 having a ground support disposed adjacent the outlet opening of the shaft, the support having a top end and a bottom end and being adapted to space the outlet opening from the bottom end of the support.

4. Insect trap according to claim 1 in which the receptacle is made from a translucent blue material.

5. Insect trap according to claim 1 in which the receptacle includes a light source.

6. Insect trap according to claim 1 in which the shaft incorporates a decorative lighting chamber disposed beneath the inlet to the said at least one conduit, said lighting chamber comprising a wall of the shaft apertured to permit light to shine out of the shaft, and a light source disposed inside said chamber, and in which a pedestal support is adapted to space the lighting chamber and the outlet opening from the ground.

7. Insect trap according to claim 1 having a back pressure chamber defined in said second end of the shag between the fan and the said outlet opening, the back pressure chamber having a wall which is inwardly tapered so that the chamber is wider adjacent the fan and narrower adjacent said inlet to said at least one conduit.

8. Insect trap according to claim 1 having a back pressure chamber defined in said second end of the shaft between the fan and the said outlet opening, the back pressure chamber having an inwardly directed back-pressure plate disposed downstream from said at least one conduit with the said at least one conduit between the plate and the fan.

9. Insect trap according to claim 1 in which the bait receptacle is separable from the shaft.

* * * * *